(12) United States Patent
Gurkaynak et al.

(10) Patent No.: US 10,931,220 B2
(45) Date of Patent: Feb. 23, 2021

(54) VARIABLE SPEED MAXIMUM POWER POINT TRACKING, SOLAR ELECTRIC MOTOR CONTROLLER FOR INDUCTION AND PERMANENT MAGNET AC MOTORS

(71) Applicant: SunTech Drive, LLC, Boulder, CO (US)

(72) Inventors: Yusuf Gurkaynak, Arvada, CO (US); Nikola Milivojevic, Boulder, CO (US); Gerhard Hautmann, Radolfzell (DE); John LoPorto, Superior, CO (US)

(73) Assignee: PREMIER ENERGY HOLDINGS, INC., Frederick, CO (US)

( * ) Notice: Subject to any disclaimer, the term of this patent is extended or adjusted under 35 U.S.C. 154(b) by 0 days.

(21) Appl. No.: 15/768,533

(22) PCT Filed: Oct. 12, 2016

(86) PCT No.: PCT/US2016/056618
§ 371 (c)(1),
(2) Date: Apr. 13, 2018

(87) PCT Pub. No.: WO2017/066307
PCT Pub. Date: Apr. 20, 2017

(65) Prior Publication Data
US 2018/0278193 A1  Sep. 27, 2018

Related U.S. Application Data

(60) Provisional application No. 62/240,979, filed on Oct. 13, 2015.

(51) Int. Cl.
*H02P 27/08* (2006.01)
*G05F 1/67* (2006.01)
(Continued)

(52) U.S. Cl.
CPC ............ *H02P 27/08* (2013.01); *G05F 1/67* (2013.01); *H02M 3/158* (2013.01); *H02P 1/26* (2013.01);
(Continued)

(58) Field of Classification Search
CPC .... H02P 27/08; H02P 1/52; H02P 1/26; G05F 1/67; H02M 3/158; H02S 40/32
See application file for complete search history.

(56) References Cited

U.S. PATENT DOCUMENTS 4,263,540 A * 4/1981 Brandt .................. F25B 31/02
310/198
5,446,361 A * 8/1995 Van Der Broeck ..... H02P 25/04
318/400.41
(Continued)

FOREIGN PATENT DOCUMENTS

JP    S6265116 A   3/1987
JP    H0654585 A   2/1994
(Continued)

OTHER PUBLICATIONS

Kumar Rajan et al. ("BLDC motor driven solar PV array fed water pumping system employing zeta converter", 2014 IEEE 6th India International conference on Power electronics Dec. 8, 2014 (Dec. 8, 2014)) (Year: 2014).*

(Continued)

*Primary Examiner* — Kawing Chan
*Assistant Examiner* — Bradley R Brown
(74) *Attorney, Agent, or Firm* — Lathrop GPM LLP (57) ABSTRACT

Solar Motor Controller is an electronic device with DC power input terminals that may connect directly to solar PV panels, and output terminals that may connect directly to single or multiphase phase AC electric motors without requiring an energy storage subsystem. The Controller runs
(Continued)

electric motors of many frequencies and is capable of interfacing to multiple voltages of solar PV panels with or without maximum power point tracking. The Controller may drive motors in water pumping, HVAC, refrigeration, compressors operation, blowers, machine tools, and many other applications; some controller applications may operate at motor speeds adjusted to conform to power available from attached solar panels.

16 Claims, 5 Drawing Sheets

(51) Int. Cl.

| | | |
|---|---|---|
| *H02P 1/26* | (2006.01) | |
| *H02S 40/32* | (2014.01) | |
| *H02P 1/52* | (2006.01) | |
| *H02M 3/158* | (2006.01) | |
| *H02S 40/30* | (2014.01) | |
| *H02P 1/42* | (2006.01) | |
| *H02P 27/04* | (2016.01) | |
| *H02M 7/5387* | (2007.01) | |

(52) U.S. Cl.
CPC ............... *H02P 1/42* (2013.01); *H02P 1/426* (2013.01); *H02P 1/52* (2013.01); *H02P 27/047* (2013.01); *H02S 40/30* (2014.12); *H02S 40/32* (2014.12); *H02M 7/53871* (2013.01); *Y02E 10/56* (2013.01)

(56) References Cited

U.S. PATENT DOCUMENTS

| | | | | |
|---|---|---|---|---|
| 6,232,742 | B1* | 5/2001 | Wacknov | H02M 3/1563 318/774 |
| 7,126,294 | B2 | 10/2006 | Minami et al. | |
| 8,937,822 | B2* | 1/2015 | Dent | H02J 7/35 363/55 |
| 2006/0290317 | A1* | 12/2006 | McNulty | H02J 7/35 318/801 |
| 2010/0073969 | A1* | 3/2010 | Rajagopalan | H02M 1/10 363/37 |
| 2010/0164428 | A1* | 7/2010 | Xu | F01D 15/10 318/767 |
| 2011/0056226 | A1* | 3/2011 | Okubo | F04C 28/06 62/208 |
| 2016/0197566 | A1* | 7/2016 | Alvey | F25B 49/025 318/781 |

FOREIGN PATENT DOCUMENTS

| | | |
|---|---|---|
| JP | 2011050204 A | 3/2011 |
| JP | 2012514447 A | 6/2012 |
| JP | 2003009572 A | 1/2013 |
| WO | WO 2015025557 A1 | 2/2015 |
| WO | WO 2015204009 A2 | 2/2015 |

OTHER PUBLICATIONS

International Search Report of PCT/US2016/056618 dated Feb. 17, 2017, 12 pp.
International Preliminary Report on Patentability of PCT/US2016/056618 dated May 19, 2018, 13 pp.
European Patent Application No. 16856101.7 extended European search report dated Apr. 23, 2019, 8 pages.
Kumar Rajan et al: BLDC motor driven solar PV array fed water pumping system employing zeta converter , 2014 IEEE 6TH India International Conference on Power Electronics (IICPE), IEEE, Dec. 8, 2014, p. 1-6.
Chinese Patent Application No. 201680071308.2 First Office Action dated Jul. 26, 2019, with English translation, 21 pages.
Japanese Patent Application No. 2018-519852, Office Action dated Nov. 30, 2020, with English translation, 24 pages.

* cited by examiner

VARIABLE SPEED MAXIMUM POWER POINT TRACKING, SOLAR ELECTRIC MOTOR CONTROLLER FOR INDUCTION AND PERMANENT MAGNET AC MOTORS

RELATED APPLICATIONS

This application claims the benefit of priority of U.S. Provisional Patent Application No. 62/240,979 filed Oct. 13, 2015, the content of which is incorporated herein by reference in its entirety.

BACKGROUND

Residential and commercial motor loads are increasing worldwide. If the electrical grid is well developed, these loads are applied to the grid. Where the grid is overloaded or undeveloped, or even absent, off-grid distributed energy generation, typically involving gasoline or diesel generators, solar panels, or wind turbines, is used to support additional loads.

Wind and solar systems are both subject to vagaries of output caused by such natural phenomena as weather, including presence, absence, or damaging gusts of wind, clouds, snow accumulation, the seasons, and the day-night cycle, for purposes of this document such power is referred to as time-variable power. Many off-grid solar and wind systems overcome these vagaries by using solar panels and wind turbines to provide power to charge a battery or other electrical energy storage system; energy is then drawn from the storage system as needed to power loads.

Batteries, and other electrical energy storage systems such as hydroelectric pumped storage systems, are expensive and sometimes environmentally unfriendly. In order to minimize energy storage requirements, systems may take advantage of thermal inertia and gravity by, for example, pumping water from deep wells into stock tanks, gravity tanks or cisterns, when time-variable power is available, then storing the water for later use. Typical motor loads associated with off-grid distributed energy generation include solar water pumping (including hydroelectric pumped storage), solar-powered air conditioning and refrigeration, and other systems where at least some motor loads are active only where there is enough solar insolation or wind to run them, while when solar or wind power is not available, some or all loads are off.

An example of a prior motor load adapted to operation with distributed solar generation is the Grundfos® SQF (Trademark of Grundfos Pumps Corporation, Decatur, Ill.) series of well pump assemblies. These pump assemblies have an electronics section configured for direct connection to solar panels at 30 to 300 volts DC and adapted to power a motor, the motor coupled to drive a water pump. These pumps are intended to pump water from a well into a stock tank, cistern, or gravity tank when time-variable power is available from solar panels, shutting down when no power is available or the stock tank, gravity tank, or cistern is full.

In addition to solar power systems, wind turbine systems also have time-variable output, and may have motor loads.

SUMMARY

A system has an AC induction electric motor and at least one photovoltaic panel. The photovoltaic panel is coupled to provide power to a DC-DC converter and provide a second voltage, always higher than voltage on photovoltaic panel. The second voltage is provided to a variable-frequency motor drive, coupled to provide power to the AC electric motor. The system operates under control of a microcontroller that regulates the second voltage and uses a maximum-power-point tracking firmware to adjust frequency of the variable frequency motor drive to optimize power output for a given solar DC input.

In another embodiment, a method of operating an AC motor powered by a limited DC power source providing a first DC voltage includes converting power from the limited DC power source to a second DC voltage; converting power from the second DC voltage to an AC motor voltage at a first AC frequency and a first AC voltage; providing the AC motor voltage to the AC motor; detecting startup of the AC motor; and after startup of the AC motor, increasing voltage and frequency of the AC motor voltage until reaching either a maximum frequency, or a limit of the DC power source.

DETAILED DESCRIPTION OF THE EMBODIMENTS

A system 100 (FIG. 1) has a solar photovoltaic power source including one or more photovoltaic panels 102, a controller 104, and a motor load 106. Solar panels of the photovoltaic power source are coupled in series, parallel, or series-parallel to provide a DC (Direct Current) output 108 at a first voltage. This first voltage is received in controller 104 at a DC to DC voltage converter 110 to provide power 112 at a second voltage convenient for operating other components of controller 104, in a particular embodiment DC-DC converter 110 is a boost converter, however in alternative embodiments buck-boost or other converter configurations are used.

Figures 1, 4:
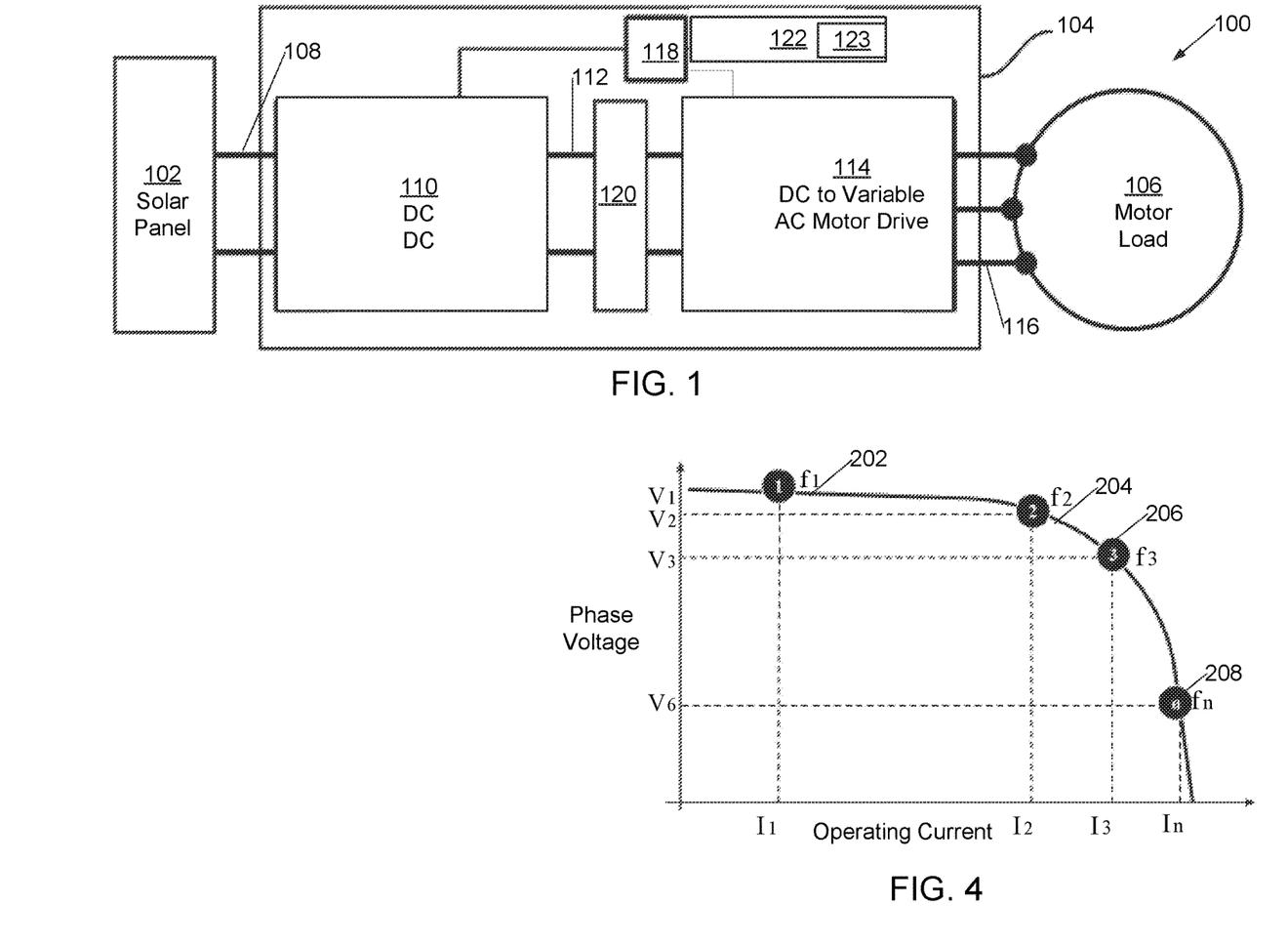
FIG. 1 is a block diagram of a system incorporating a set of solar panels, a motor load, and a controller adapted to receive power from the panels and to drive the motor.
FIG. 4 illustrates operating current and solar panel voltages of the MPPT (maximum power point tracking) firmware.

The controller also has a DC-powered variable frequency AC motor drive (VFD) 114 coupled to receive power at the second voltage from DC-DC converter 110, and to provide a single/multiphase AC drive power 116 at a third voltage to motor load 106. In a particular embodiment, VFD 114 has sine-wave output. Both the DC-DC converter 110 and VFD 114 operate under control of a microcontroller 118. Filter capacitors 120 are typically provided to reduce voltage ripple and help with surge currents at the second voltage 112.

The DC-DC converter 110 converts power received from solar panels 102 to a regulated and predetermined DC link voltage 112 on filter capacitors 120, suitable for the operation of VFD 114. In an embodiment, when the system 100 is operating, DC-DC converter 110 is controlled by microcontroller 118 to operate with first voltage 108 at a maximum power point of the solar panels 102 and its output 112 at a convenient voltage for operating the VFD 114.

VFD 114 converts DC power to an AC voltage 116 suitable for motor 106 at a variable motor drive voltage and frequency, the motor drive voltage and frequency determined by microcontroller 118 according to power available from solar panels 102.

Microcontroller 118 senses voltage and current on the solar panels 102 and sets up a frequency reference for VFD 114, so that power transfer from solar PV panels 102 is maximized according to an "Maximum Power Point Tracking—MPPT" algorithm by executing firmware in memory 122, where operating frequency of the VFD is reduced from a rated motor operating frequency to conserve power when little power is available from solar panels 102 and increased to the rated motor operating frequency when full power is available from solar panels 102.

Microcontroller 118 has a table containing a motor phase voltage-frequency operational curve in memory 122, which determines phase output 116 RMS voltage value based on the reference frequency. Therefore, frequency and voltage on the variable drive output are both variable and under control of microcontroller 118, in order to maximize power transfer for various solar conditions. It is expected that with some motor loads such as positive-displacement pumps, lower speed operation of motor and motor load will consume less power than high speed operation of the same motor and pump load. In a particular embodiment, microcontroller 118 also has additional control inputs, such as a water-tank level sensor or a thermostat, to permit operation when motor operation is needed or desired, shutting down motor operation when motor operation is not required and to avoid damage that could arise from, for example, overflowing water storage tanks.

Microcontroller 118 also senses the second voltage in order to regulate DC-DC converter 110 output voltage and power drawn from solar panels 102 such that maximum power is drawn from the panels. Microcontroller 118 in some embodiments also is configured with a maximum motor drive frequency for use with VFD drive 114 and motor 106, and limits the reference frequency and DC-DC converter operation accordingly even when this results in less power drawn from the solar panels that would otherwise be available.

Figure 2:
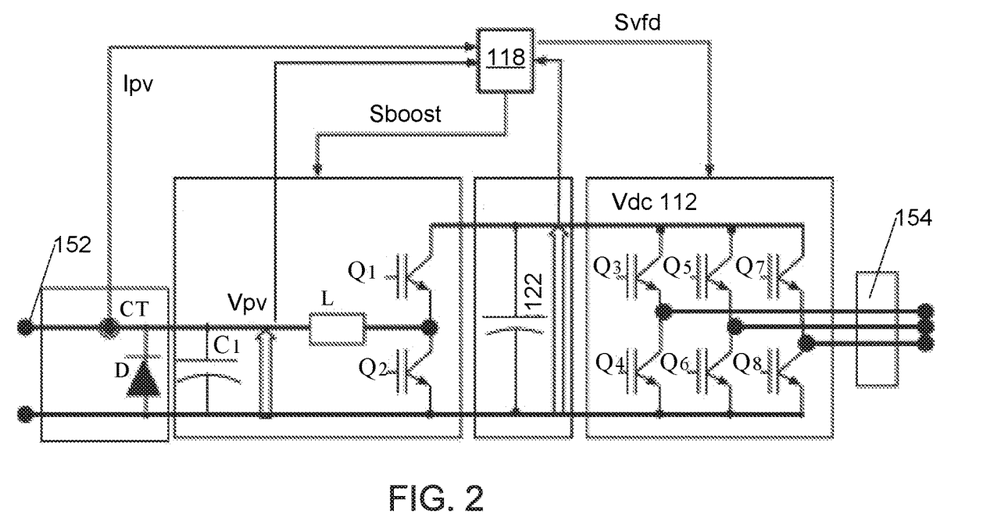
FIG. 2 is a more detailed diagram of an embodiment of the controller of FIG. 1.

With reference to FIG. 2, a current sensor CT is positioned next to a connector 152 intended for coupling to panels 102, so to measure current provided by the panels 102 as current Ipv and provide measurements to microcontroller 118. A diode D is positioned to automatically shorts the PV panels if polarity of panels 102 is reversed. Capacitor C1 is provided to attenuate voltage ripple on the solar PV panels, while voltage Vpv provided by the solar panels is also monitored by the microcontroller 118. Power absorbed from solar panels 102 is determined from Ipv and Vpv measurements by multiplication.

In an embodiment DC-DC converter is a boost converter including power inductor (L) and two power switches Q1 and Q2, connected so to provide boost functionality when operated using control of a pulse-width and pulse-rate modulated signal Sboost provided by microcontroller 118. Boosted voltage is filtered in capacitor bank 122, and second voltage DC level 112 is measured as Vdc by microcontroller 118.

DC link voltage presents an input to VFD 114, which may have additional voltage conversion devices and in a particular embodiment is a single or three-phase switching driver having 2 or 6 power switches controlled by signals S from microcontroller 118. Operation of VFD 114 results in variable frequency and voltage AC waveforms provided on the output of variable drive output terminals 154 for provision to AC motor 106.

Figure 5:
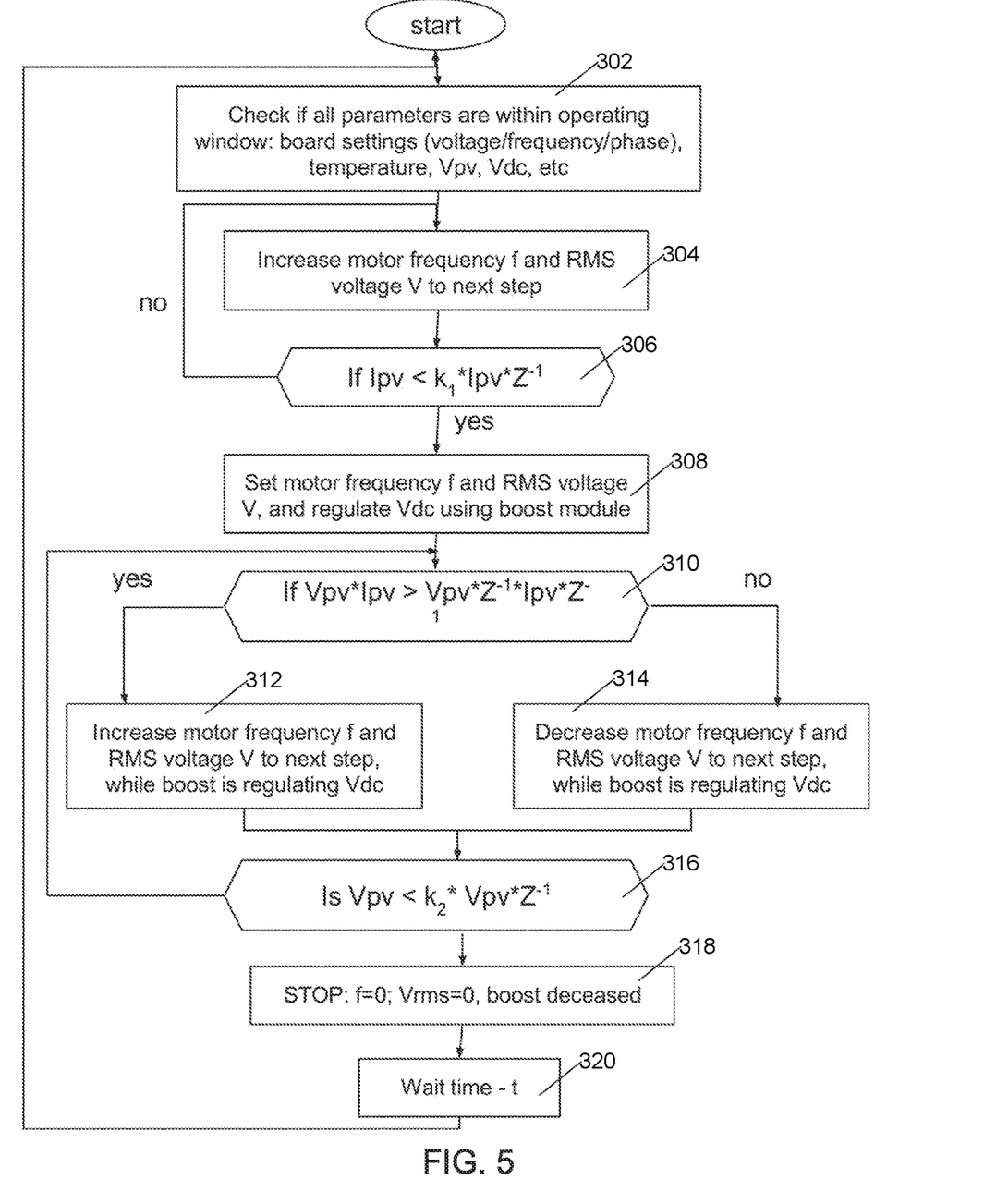
FIG. 5 is a flowchart illustrating operation of microcontroller 118 firmware.

Microcontroller 118 operates under control of firmware residing in memory 122. In a particular embodiment, the firmware includes a start-up routine, a maximum power point tracking (MPPT) operational routine, and a shutdown routine. With reference to FIGS. 1, 4, and 5, these include:

1. Start-Up Routine

Once the controller is powered up and basic functionality checked 302, The Microcontroller 118 checks the Vpv voltage received from PV panels 102 and only if the voltage is higher than a predetermined minimum starting voltage recorded in memory 122 it continues with start-up routine. If Vpv voltage is lower than minimum, it waits for Vpv to exceed the minimum.

Once the minimum startup voltage is reached, microcontroller 118 sets 304 the frequency of an initial sine wave that VFD 114 will create. Microcontroller 118 then determines a magnitude of the sine wave (phase RMS voltage) from the frequency using a voltage-frequency curve (V-f curve) shown on FIG. 3 and stored in memory 122. Memory 122 in embodiments includes one or more of a read-only memory, programmable read-only memory, or an electrically-erasable and rewritable read-only memory, and the V-f curve is determined as needed for the specific motor 106 type used. The V-f curve does not start from zero, but has a voltage offset (Vmin) giving a minimum phase RMS motor voltage for a minimum frequency value.

The microcontroller 118 starts system 104 operation by providing the determined frequency and voltage to VFD 114 via signals $S_{VFD}$. As a result an AC with frequency f1 and magnitude phase RMS voltage V1 is provided to motor 106.

The Microcontroller 118 then checks solar PV current 306 via feedback sensor signal Ipv (solar PV current), and if Ipv decreases by certain percentage (x %) in value from a previous reading value (Ipvnew<Ipvold*x %), that indicates that motor 106 has started to rotate. In a particular embodiment, x % is 10%. On another hand, if the new reading on PV current sensor (Ipv) is not less than the predetermined percentage x % of the value of previous reading, then the motor 106 is determined as not started yet, so it continues to another step by increasing VFD's 114 operating frequency 304 to f2, and accordingly operating phase voltage to another phase voltage V2. The percentage value x % (a threshold to recognize a start) is adaptive and varies with a power level of an AC motor and load.

In an alternative embodiment, instead of observing for a drop of Ipv to verify proper starting of motor rotation, microcontroller 118 directly observes motor rotation with a motor-speed sensor (not shown). In embodiments, the motor speed may include a magnet and sensing coil, a toothed wheel, LED, and photosensor, a toothed wheel and reluctance sensor, an inertial switch, or any other rotation sensor as known in the art.

When the microcontroller 118 advances VFD 114 frequency to f2, via signals $S_{VFD}$, to provide an f2 sine wave frequency, with appropriate voltage magnitude V2, on variable drive output terminals 116

The Microcontroller 118 continue increasing frequency and voltage for VFD 114 and keeps checking the solar PV current via feedback signal Ipv, until Ipv sensor shows that new solar PV current value is less than the certain percentage x % of an initial or previous value, which means that motor started rotation, or a motor-speed sensor detects adequate rotation, and 110 transitions to MPPT Regular Mode.

If solar PV current (Ipv) does not decrease by the certain percentage x % of a value, from one frequency step to another, and frequency gets to its maximum value as stored in memory 122, (the maximum frequency is known for each motor type) then motor has not started to rotate, then it stops operating VFD 114 and tries the START-UP ROUTINE again after a predetermined pause time. This allows some high starting loads, such as those produced by pressurized refrigerant in an HVAC or refrigeration system, or a full output water column behind a well pump, to dissipate.

2. Maximum Power Point Tracking (MPPT) Regular Mode

Once microcontroller 118 concludes that motor has been started, DC-DC converter regulates 308 DC second voltage 112 at a pre-set value Vset via signals Sboost that are directly controlling power switches Q3-Q8 of AC/DC motor drive 114.

The DC link 112 regulation means that DC-DC converter 110 adjusts the voltage value of DC link 112 until it reaches desired value Vset, by changing duty cycle of operation on power switches Q1 and Q2 of boost circuit (FIG. 2).

Signal feedback Vdc is measuring DC second voltage 112 value for microcontroller 118

Figure 3:
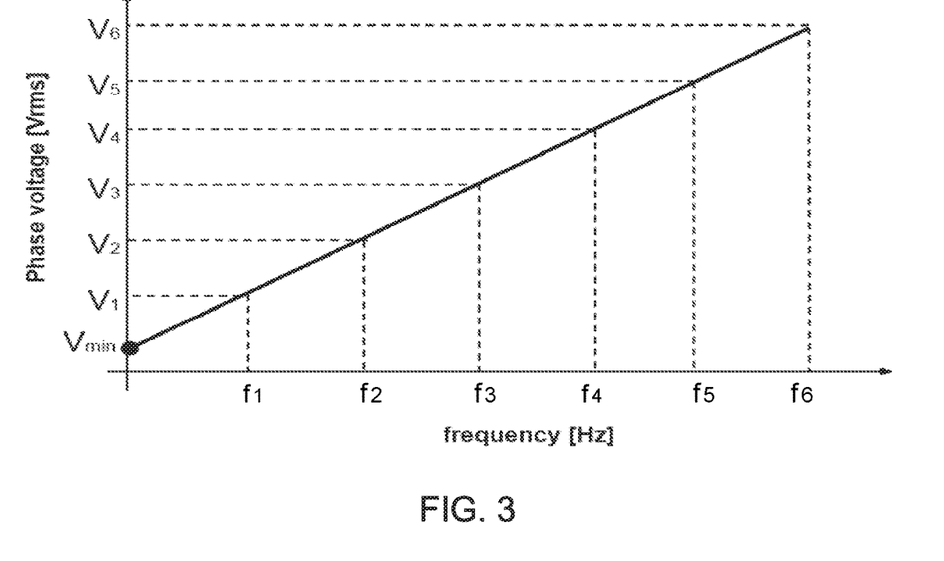
FIG. 3 illustrates an operating voltage versus frequency curve.

If Vdc feedback value is lower than Vset value, then duty cycle for DC-DC converter increases a value of Sboost signal to increase the voltage value of DC link 112, until the duty cycle on DC-DC converter reaches its maximum value While DC-DC converter 110 is regulating DC link voltage 112 at pre-set value Vset and at less than a maximum frequency, as determined by values in memory 122, MPPT algorithm in memory 122 executes on microcontroller 118 to increase motor frequency for the VFD 114, which involves increasing the phase RMS voltage accordingly, based on voltage-frequency curve of FIG. 3. In doing so, the microcontroller 118 compares 310 current power draw from the photovoltaic panels to previous power draw from the photovoltaic panels. If the power has increased, the microcontroller increases 312 frequency and voltage of the variable frequency drive 114, and if power consumption has not increased due to power limitations of solar panels 102, the microcontroller decreases 314 frequency and voltage of the variable frequency drive 114.

By increasing the frequency and the voltage of the AC power generated by VFD, the motor is instructed to rotate with faster RPM, which increases power consumption by VFD 114 and motor 106, thereby increasing power drawn from solar PV panels 102.

The increase in frequency is in steps, where a first step 202 is for motor frequency 1 (f1) set by microcontroller 110, and motor 106 operating at frequency 1 corresponds to the solar PV power shown on the FIG. 4 as operating at point 202 (solar current I1 and voltage V1).

The microcontroller 118 then increases the frequency (f2) of the motor power 116 generated by VFD 114, the next operating point at higher frequency is shown on FIG. 4 as point 204 with higher solar PV current (I2), but lower solar PV voltage V2. VFD frequency increases are limited to not exceed a maximum rated frequency for the particular motor and load.

If microcontroller 118 keeps increasing the motor frequency, there is a point at which power obtained from the solar PV panel (Power=I×V) is at its maximum, which is shown as point 206 on FIG. 4. The maximum power point found by this algorithm varies significantly with insolation.

If the frequency keeps increasing (motor is rotating faster and requires more power), power output of the solar PV panel 102 will start decreasing as maximum power production is reached, with voltage dropping faster than current increases (characteristic of V-I curve at point 208 shown on FIG. 4), as the solar PV panels cannot provide necessary power for motor's operation at that or higher speeds.

As a result, the DC link voltage drops, because the panels cannot provide sufficient power to maintain DC link voltage, Once the microcontroller senses that DC link voltage decreased 316, it decreases the frequency on VFD back to a lower frequency step in order to enable dc-dc converter to regain DC link voltage regulation Once DC link voltage regulation is established, and microcontroller 118 senses that it's within required limits, the MPPT algorithm starts increasing the frequency for the VFD 114 again in order to increase the rotational speed of motor 106. If DC link voltage value decreases below a threshold Vfdrop, then the microcontroller immediately decreases operating frequency by a predetermined frequency decrease value f2, which is much larger frequency change (step) than used within the maximum power point tracking mechanism. If this frequency decreases by step f2 does not allow DC link voltage to recover above threshold value Vfdrop, then the microcontroller 118 decreases operating frequency by another f2, until the DC link voltage becomes higher than threshold value Vfdrop.

3. Stop Routine

During the regular mode operation, microcontroller 118 is checking the voltage across solar PV panels 102 (Vpv signal). If the value of Vpv drops by more than a power-drop limit value from memory 122, to a predetermined value Vd (stored in the memory of the microcontroller) then microcontroller 118 concludes that motor should stop rotation, and it shuts down 318 the operation of VFD 114, waits certain period of time 320 as appropriate for the motor and loads driven by motor 114, and goes into START-UP ROUTINE.

If such start-stop event happens several times in a row (predetermined limit on the number of attempts is stored in the memory of the microcontroller), then the microcontroller concludes there is not enough solar energy available on the panels to run the motor, and goes idle for a longer wait time Wsun. After waiting Wsun, if a minimum voltage is available on the panels indicating daylight conditions, the controller retries startup by returning to the START-UP-ROUTINE.

In a particular embodiment, the motor 106 is a three-phase motor, and variable-frequency motor drive 114 provides three phases of alternating current to drive motor 106; in an alternative embodiment motor 106 is a split-phase motor, where VFD 114 provides to motor drive phases and a phase-shifted start or run power supply to motor 106. In another particular embodiment, motor 106 is a single phase motor having integral motor starting circuitry including a starting capacitor, and VFD 114 provides to motor 106 a single phase of AC power.

In a particular embodiment, the variable frequency motor drive 114 provides a sine-wave output to drive motor 106.

In an alternative embodiment, the solar panel 102 of FIG. 1 is replaced with a wind turbine generator system and an associated rectifier to provide DC power to DC-DC converter 110; in such a system a wind turbine rotation speed sensor may optionally be provided as an input to microcontroller 118 and firmware 122 adapted to use wind turbine speed information, as well as current and voltage information, in adjusting VFD 114 so as to avoid stalling the wind turbine and optimize power transfer to motor 106.

In another alternative embodiment, the solar panel 102 of FIG. 1 is replaced with a generator driven by a gasoline, diesel, gas turbine, or steam engine (which may be piston or turbine); typically with an associated rectifier to rectify any AC produced by the generator and to provide DC power to DC-DC converter 110. In such systems a throttle input is provided to controller 104, the system then is capable of acting as a variable-ratio electric transmission. Variable ratio electric transmissions have many uses, while different in architecture and many details of operation (including use of DC motors) from the presently described system, the US Navy operated variable-ratio electric transmissions instead of reduction gears in the main engine systems of the New Mexico, Tennessee, and Colorado classes of battleships from 1918 to 1947.

Figure 6:
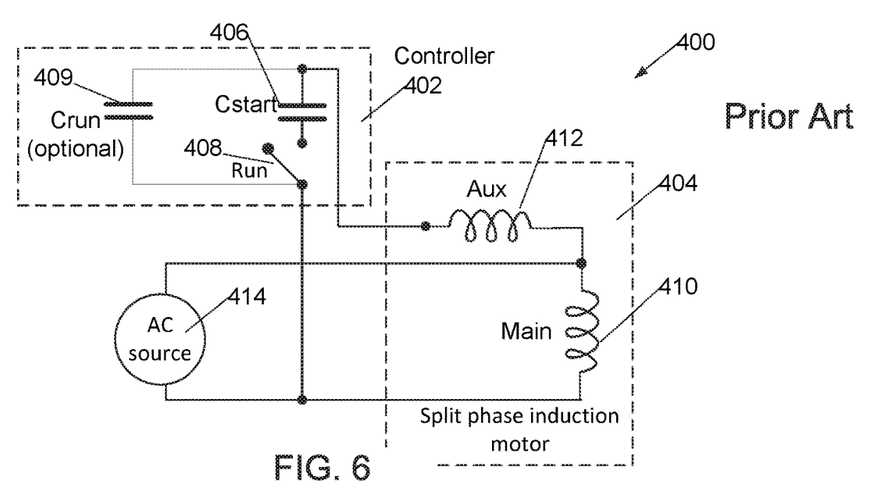
FIG. 6 is a schematic illustration of a traditional capacitor-start 3-wire motor control system.

A traditional split phase motor system 400 (FIG. 6) with a capacitor-start controller 402 and a 3-wire single phase motor 404, with a starting capacitor 406 and a control relay 408 in the controller 402. Motor 404 has a main winding 410 and an auxiliary, starting, winding 412. The control relay 408 connects the capacitor 406 in series with the starting winding 412 to the AC source 414 during motor startup, in parallel with main winding 410. The control relay 408 disconnects the capacitor 406 and starting winding 412 once the motor has started rotation. The capacitor 406 effectively gives a 90-degree phase shift between power applied to the main winding 410 and the starting winding 412. In some, but not all, traditional capacitor-start controllers, a separate capacitor Crun 409 is provided to allow some use of starting winding 412 while the motor is running to increase torque, in these controllers Crun typically has a significantly smaller value than Cstart to help reduce run-time current and power dissipation from motor-starting surge currents. While this traditional motor system 400 is quite commonly used, it has drawbacks, among which are very high surge current and power required to start the motor at full operating frequencies. The MPPT variable-frequency motor control system described with reference to FIGS. 1-3 is used with the embodiment of FIG. 7 discussed below.

In this arrangement, it can be written that:

$$Vaux = VPhs - Vph1, \text{ where } Vaux \text{ is voltage across the starting winding.} \quad (1)$$

$$Vmain = VPh2 - VPh1 \quad (2)$$

If we've chosen PhS to be auxiliary winding power, which acts as a starting winding, it will get switched off (no current through it) as soon as motor starts rotation.

Apart from starting the 3 wire motor using auxiliary winding, the motor will be driven in variable frequency mode, while keeping a Voltage-/frequency (V/F) ratio constant, where RMS phase voltage and f is its frequency—as explained above in paragraph]. In order to freely control the motor in V/f fashion, voltage waveforms on nodes: Ph1, Ph2 and PhS will be generated as shown in equations 3-5:

$$VPh1 = Vdc/2 + Vdc/2 * duty1 * \sin(x) \quad (3)$$

$$VphS = Vdc/2 + Vdc/2 * duty2 * \sin(x-\theta) \quad (4)$$

$$VPh2 = Vdc/2 + Vdc/2 * duty3 * \sin(x-\Gamma) \quad (5)$$

where all three waveforms are offset by Vdc/2, half of the input DC voltage. Furthermore, waveform VphS is shifted by angle θ in respect to the VPh1, while waveform VPh2 is shifted by angle γ in respect to the VPh1.

It is possible to create those 3 voltage waveforms by using microcontroller to apply PWM signals to switching devices of the VFD.

If PhS is starting winding power, that means Ph2 is main winding power, and as above equations show, the voltage across main winding is Vmain=Vph1−VPh2, so if objective is to have maximum magnitude on main winding, then voltage waveforms of VPh2 and VPh1 should be of equal magnitudes (duty 1=duty3), but opposite directions (γ=180°. The magnitude of main winding should be maximized for the given input DC voltage as well, so following equation 2:

$$Vmain = Vph1 - VPh2 \Rightarrow Vmain = Vdc * duty1 * \sin(x) \quad (6)$$

In addition, voltage waveform on auxiliary winding should be near 90° in respect to the main winding, but with the same magnitude, which can be derived from equation 6 as:

$$Vaux = Vdc * duty1 * \sin(x - 90°) \quad (7)$$

If we combine equation 7 with equation 1, we'll get waveform equation for VPhs as:

$$Vaux = VphS - VPh1$$

$$\Rightarrow VphS = Vaux + VPh1 = Vdc/2 + Vdc/2 * duty1 * \sin(x) + Vdc * duty1 * \sin(x - 90°)$$

$$\Rightarrow VPhs = Vdc/2 + Vdc * duty1 * (\sin(x - 90°) + \frac{1}{2} * \sin(x)) \quad (8)$$

Equation 8 has to be written in the format of equation 4 for VphS waveform, and such type of transformation is called "Arbitrary phase shift" transformation, where general rule says:

$$A * \sin X + B * \sin(X + Y) = C * \sin(X + Z) \quad (9)$$

where coefficient C can be calculated as:

$$C = \text{sqrt}(A^2 + B^2 + 2 * A * B * \cos(Y)) \quad (10)$$

and angle Z can be calculated as:

$$Z = \text{atan}(B * \sin(Y)/(A + B * \cos(Y))) \quad (11)$$

Using equations 10 and 11, it's possible to solve for unknowns duty2 and θ from equation 4, so we get:

$$duty2 = 2.23 * duty1$$

$$\text{angle } \theta = 63°.$$

Now, voltage waveforms of 3 phase inverter shown on fig. X can be shown as:

$$VPh1 = Vdc/2 + Vdc/2 * duty * \sin(x) \quad (12)$$

$$VphS = Vdc/2 + Vdc/2 * 2.23 * duty * \sin(x - 63°) \quad (13)$$

$$VPh2 = Vdc/2 + Vdc/2 * duty * \sin(x - 180°) \quad (14)$$

where duty is a V/f ratio of phase rms voltage and frequency for variable frequency operation of an AC motor.

Figure 7:
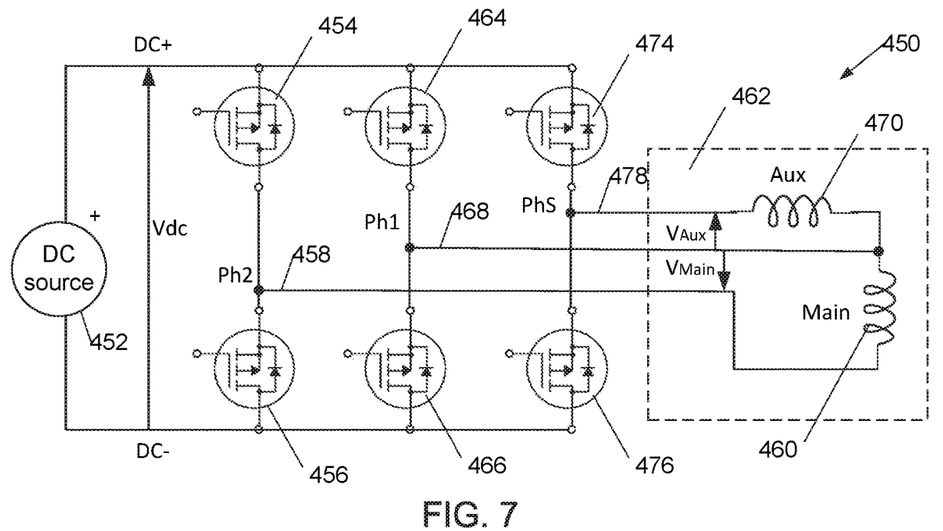
FIG. 7 is a schematic illustration of a split-phase motor-driver inverter configured for starting running a 3-wire motor.

FIG. 7 is a schematic illustration of a frequency-controllable, split-phase, DC-to AC variable motor drive inverter 450 configured for starting and running a 3-wire, split-phase, motor from a single-ended DC supply 452. A positive 454 and a negative 456 Ph2 power switching device are driven alternately to provide a phase 2 (Ph2) AC signal 458 to drive main winding 460 of 3-wire split-phase motor 462. Similarly, a separate positive 464 and a negative 466 Ph1 power switching device are driven alternately to provide a phase 1 (Ph1) AC signal 468 to drive a common connection to which is connected a first end of starting winding 470 and a second end of main winding 460 of 3-wire split-phase motor 462. Finally, a separate positive 474 and a negative 476 PhS power switching device are driven alternately to provide an offset phase 3 (PhS) AC signal 478 to drive a connection to which is connected a second end of starting winding 470 of 3-wire split-phase motor 462.

Figure 8:
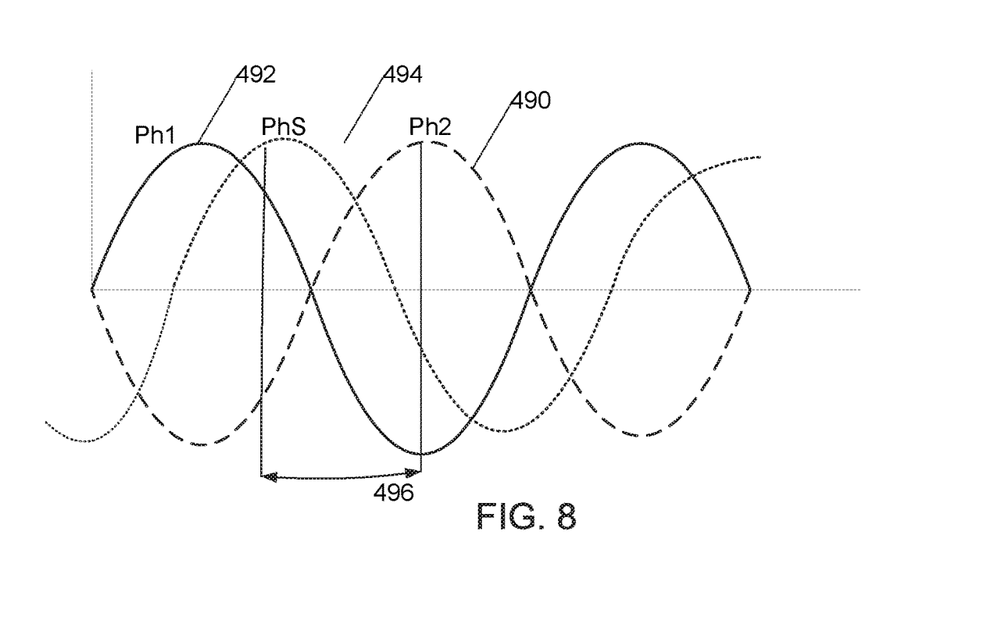
FIG. 8 is a waveform diagram illustrating applied voltages in the system of FIG. 7

During startup operation, the frequency-controllable, split-phase, DC- to AC variable motor drive inverter 450 is operated to provide waveforms as illustrated in FIG. 8. In a particular embodiment, power switching devices 454, 456, 464, 466, 474, 476 are not mere switching transistors, but are bidirectional power transfer devices using high frequency switching-converter techniques adapted to provide sinusoidal waveforms. The positive 454 and negative 456 power switching devices are operated to provide a sinewave 490 at a startup frequency to the Ph2 connection of main winding 460, while the positive 464 and negative 466 power switching devices are operated to provide a sinewave 492 at the startup frequency to the Ph1 connection of main winding 460. In order to start motor rotation, the positive 474 and negative 476 PhS power switching devices are operated to provide a sinewave 494 at the startup frequency to the PhS connection of startup winding 470 with a controllable phase offset 496. Once motor rotation has begun, positive 474 and negative 476 power switching devices are turned off to disconnect the startup winding 470, while drive to positive 454, 464 and negative 456, 466 power switching devices continue to provide power to main winding 460 to run the motor.

In a particular embodiment, during startup the phase shift 496 is configured to have the starting winding voltage PhS 494, 478 lag the negative drive voltage Ph1 468, 492 by 63 degrees for optimum efficiency.

Figure 9:
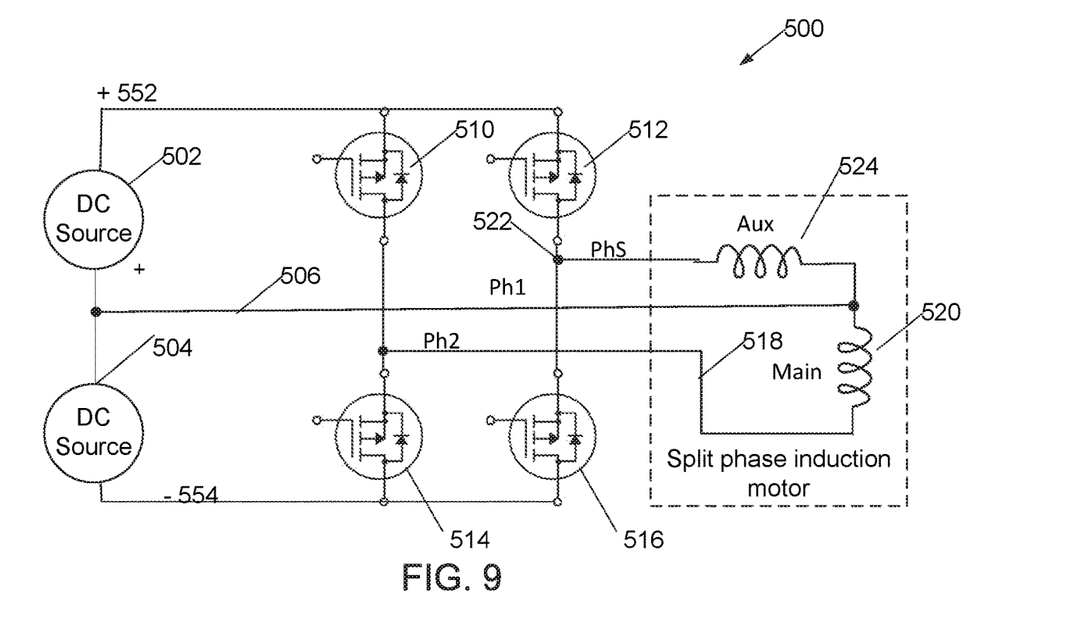
FIG. 9 is a schematic illustration of an alternative split-phase motor-driver inverter configured for starting and running a 3-wire induction motor.

FIG. 9 is a schematic illustration of an alternative split-phase inverter configured for starting and running a 3-wire induction motor. This embodiment uses a pair of DC sources 502, 504 to give positive 552 and negative 554 power rails with an effectively neutral connection 506. One of these DC sources 502 is the DC link voltage previously discussed, the other DC source 504 is a high frequency switching DC-DC converter or charge pump driven by DC source 502.

Neutral 506 replaces Ph1 468 of FIG. 7. Positive 510 and negative 514 power switching devices are configured to drive a Ph2 line 518 for driving the main winding 520 of the motor, unlike the embodiment of FIG. 7 where the AC motor drive phases 458, 468, 478 swing between zero and a high DC voltage, in this embodiment the AC motor drive phases 518 and 522 swing both positive and negative with respect to neutral 506. Positive 512 and negative 516 power switching devices are configured to drive a PhS line 522 for driving the auxiliary or starting winding 524 of the motor. In some embodiments, positive 512 and negative 516 power switching devices are directly coupled to the starting winding 524. In this embodiment, positive supply 552 is coupled to positive power switching devices 510, 512, and negative supply 554 to negative power switching devices 514, 516.

The variable frequency motor drivers of FIGS. 7 and 9 operate the power switching devices 454, 456, 464, 466, 474, 476, 510, 512, 514, 516 under control of a Controller 118 (FIG. 1) that provides for variable frequency and variable voltage operation, and permits control of the phase relationship between Ph2 458, 490, 506 and PhS 478, 494, 522, in respect to Ph1 468, 494, 518. Since the phase relationship between Ph1 and PhS is directly synthesized by the controller, instead of by a voltage drop through a reactive device such as a starting or running capacitor (FIG. 6), this phase relationship is optimizable for rapid starting and efficient power operation.

In an embodiment, an offset DPhase 123 (FIG. 1) in memory of controller 118 is added to a current phase of main winding output Ph2 to provide a current phase of VphS; these current phases are used in synthesizing pulses to the positive and negative drive power switching devices that drive outputs VPh2, VPh1 and VphS.

The embodiments discussed with reference to FIGS. 7, 8, and 9 begin motor operation at the startup frequency, the startup frequency being significantly lower than a full, maximum-power, operating frequency. Once motor rotation has begun, the present system ramps its operating frequency and operating voltage up until available power is exceeded, or a full rated operating frequency is reached. If available power is exceeded, operating frequency is reduced to conserve power in accordance with a maximum-power-point tracking algorithm as heretofore described.

Note that the auxiliary or start winding 470, 524 (FIG. 7, 9) may see an effectively lower voltage across the winding than does the main winding 460, 520. This is a consequence of because main winding 460, 520 sees voltage between Ph2 458, 506 and Ph1 468, 518 that are 180-degrees apart, while the auxiliary or start winding 470, 524 sees an effective AC voltage between Ph1 468, 512, and PhS 478, 522, that is reduced because phase difference between PhS and Ph1 is not 180 degrees; at zero phase difference between Ph2 and PhS voltage difference PhS-Ph1 is at a maximum but at a 180 degree phase difference between Ph2 and PhS, where PhS aligns with Ph1, voltage difference PhS-Ph1 reaches zero. We have found that, while traditionally a 90-degree phase difference is used for starting a three-wire, capacitor-start, motor; other phase differences may result in better operation because greater voltage appears across the starting winding. In particular, lower DC voltages at DC sources 452, 502, 504 and correspondingly lower AC voltages on Ph2, Ph1, and PhS may be used while starting and running such motors by actively driving PhS at full voltage with a phase difference where PhS leads Ph1, by approximately 117 degrees (equivalent to PhS lagging Ph2 by 63 degrees). In embodiments, PhS lags Ph1 by between 58 and 68 degrees, or leads Ph2 by between 112 and 122 degrees to provide higher effective voltage across the auxiliary or starting winding while being sufficiently offset from Ph2 to allow motor starting. The present controller permits firmware adjustment of phase on the start winding PhS to provide this higher voltage across the start winding.

For purposes of this document, firmware is an ordered sequence of machine readable instructions stored in a memory, the machine readable instructions provided to adapt the microcontroller to perform particular tasks such as tracking a maximum power point of photovoltaic panels by adjusting power drawn by the variable frequency motor drive and by regulating the second DC voltage.

Combinations

Features of the system herein described may be combined in various ways. Among combinations of features anticipated by the inventors are those cited below.

A system designated A including an AC electric motor; at least one photovoltaic panel; a DC-DC converter coupled to receive power from the at least one photovoltaic panel and provide a second DC voltage; a variable-frequency motor drive coupled to receive the second DC voltage and provide AC power to the AC electric motor; and a microcontroller configured to regulate the second DC voltage and to use a maximum-power-point tracking firmware to adjust frequency of the variable frequency motor drive to optimize power output.

A system designated AA including the system designated A wherein the microcontroller is also configured to adjust a voltage of the AC power provided to the AC electric motor.

A system designated AB including the system designated A or AA wherein the microcontroller is configured to adjust the voltage of the AC power provided to the AC electric motor with the voltage of the AC power increasing linearly with a frequency of the AC power.

A system designated AD including the system designated AA, AB, or A wherein the microcontroller has firmware adapted to gradually increase the second DC voltage and a frequency of the AC power until the AC motor starts rotating, and wherein the microcontroller recognizes that the AC motor has started rotating by detecting a change in current received from the at least one photovoltaic panel.

A system designated AE including the system designated AA, AB, AD, or A wherein the maximum power point tracking firmware comprises machine readable instructions to change a frequency of the variable frequency motor drive in steps while searching for the maximum possible power received from the at least one photovoltaic panel, while regulating the second DC voltage level to a voltage increasing proportionally with frequency of the variable frequency motor drive.

A system designated AE including the system designated AA, AB, AD, or A wherein the maximum power point tracking firmware comprises machine readable instructions to adjust the second DC voltage to obtain maximum possible power from the at least one photovoltaic panel, while the firmware comprises machine readable instructions to adjust an operating frequency of the variable frequency drive.

A system designated AF including the system designated AA, AB, AD, AE or A wherein the maximum power point tracking firmware comprises machine readable instructions adapted to monitor the second DC voltage and if said second DC voltage decreases below a predetermined threshold to decrease a frequency of the variable frequency motor drive.

A system designated AG including the system designated AA, AB, AD, AE, AF or A wherein the system is configured to detect failure of the AC electric motor to start, and when the AC electric motor fails to start to shut down the variable-frequency motor drive for a retry time and to retry starting the AC electric motor after the retry time.

A system designated AH including the system designated AA, AB, AD, AE, AF or AJ or A wherein the AC power comprises a first phase AC power coupled to a main winding of the AC electric motor and a starting phase AC power coupled to a starting winding of the AC electric motor, the first phase AC power and the starting phase AC power being offset by a nonzero phase shift.

A system designated AJ including the system designated AH wherein the nonzero phase shift is between 58 and 68 degrees or 112 and 122 degrees.

A system designated AK including the system designated AA, AB, AD, AE, AF, AG, AH, AJ, or A wherein the AC power further comprises a third phase AC power 180-degrees out of phase with the first phase AC power, the third phase AC power coupled to both the starting winding and the main winding.

A method designated B of operating an AC motor powered by a limited DC power source providing a first DC voltage comprising: converting power from the limited DC power source to a second DC voltage; converting power from the second DC voltage to an AC motor voltage at a first AC frequency and a first AC voltage; providing the AC motor voltage to the AC motor; detecting startup of the AC motor; after startup of the AC motor, increasing voltage and frequency of the AC motor voltage until reaching either a maximum frequency, or a limit of the DC power source.

A method designated BA including the method designated B wherein the AC motor voltage comprises a first phase and a starting phase AC, the first phase and starting phase differing in phase by between 58 and 68 degrees or between 112 and 122 degrees.

A method designated BB including the method designated B or BA wherein the limit of the DC power source is determined by monitoring a voltage of the DC power source as the frequency of the AC motor voltage is increased, and determining when a slight increase of the frequency of the AC motor voltage triggers a percentage drop in the voltage of the DC power source that exceeds a percentage voltage drop limit A method of operating an AC motor powered by a limited DC power source providing a first DC voltage including: converting power from the limited DC power source to a second DC voltage; converting power from the second DC voltage to an AC motor voltage at a first AC frequency and a first AC voltage; providing the AC motor voltage to the AC motor; detecting startup of the AC motor; and after startup of the AC motor varying the frequency of the AC motor drive to search for a maximum power point (MPP) of the limited DC voltage.

The method of claim 15 wherein the limited DC voltage is sourced by a device selected from the group consisting of a photovoltaic panel and a wind turbine.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A system comprising:
an AC induction electric motor;
at least one photovoltaic panel acting as an only energy source of the system;
a DC-DC converter coupled to receive power from the at least one photovoltaic panel and provide a second DC voltage;
a variable-frequency motor drive (VFD) coupled to receive the second DC voltage and provide AC power to the AC electric motor; and
a microcontroller configured to regulate the second DC voltage at a predetermined value;
the microcontroller being configured to operate in a first mode wherein the microcontroller configures the VFD to gradually and simultaneously increases a voltage of the AC power and a frequency of the AC power until the AC electric motor starts rotating, wherein the microcontroller is configured to detect that the AC motor has started rotating by detecting a decrease in current received from the at least one photovoltaic panel, and, when the motor has been detected as started, to operate in a second mode using a maximum-power-point tracking (MPPT) firmware to increase frequency of the variable frequency motor drive up to a limit, the increase being in steps of a first size, to optimize power output while continuing regulating of the second DC voltage at the predetermined value by, if the second DC voltage drops by more than a threshold, the MPPT decreasing frequency of the VFD in steps of a second size, the steps of the first size being smaller than the steps of the second size.

2. The system of claim 1 wherein the microcontroller is also configured to, in the second mode, adjust the voltage of the AC power provided to the AC electric motor when using the maximum-power-point tracking firmware to adjust frequency of the AC power to optimize power output, the voltage increasing with frequency.

3. The system of claim 1 wherein the maximum power point tracking firmware comprises machine readable instructions to adjust the second DC voltage to obtain maximum possible power from the at least one photovoltaic panel.

4. The system of claim 2 wherein the system is configured to detect failure of the AC electric motor to start, and when the AC electric motor fails to start, to shut down the variable-frequency motor drive for a retry time and to retry starting the AC electric motor after the retry time.

5. The system of claim 4 wherein the system is configured to count retry attempts to start the AC electric motor and, upon counting a maximum retry number of retry attempts, to shut down the variable-frequency motor drive for an extended retry time, and to retry starting the AC electric motor after the extended retry time.

6. The system of claim 1 wherein the AC motor is a three-wire, single-phase, AC induction motor, and wherein during the first mode the AC power comprises a first phase AC power coupled to a common node of the AC electric motor, a third phase AC power coupled to a starting winding of the AC electric motor, and a second phase AC power coupled to the main winding of the AC electric motor having a voltage magnitude equal to a voltage magnitude of the first phase AC power and the second phase AC power having phase 180 degrees from a phase of the first phase AC power, the first phase AC power and the third phase AC power being offset by a nonzero phase shift, and the third phase AC power has a higher voltage magnitude than magnitudes of the first and second phases AC power when in the first mode.

7. The system of claim 6 wherein the nonzero phase shift is between 58 and 68 degrees, and wherein during the second mode the starting winding is undriven while the main winding is driven in the second mode.

8. A method of operating an AC motor powered by a limited DC power source providing a first DC voltage, the AC motor being a single-phase induction motor, comprising:
converting power from the limited DC power source to a second DC voltage; regulating the second DC voltage at a predetermined value: converting power from the second DC voltage to an AC voltage applied to a main winding of an AC motor at a first AC frequency and a first AC voltage while providing an AC voltage to a starting winding of the AC motor at a second voltage that is greater than the first voltage; ramping the first and second AC voltage and the first AC frequency from low values towards operating voltage and frequency until the AC motor starts; detecting startup of the AC motor by detecting a decrease in current drawn from the limited DC power source;
after startup of the AC motor, disconnecting the starting winding while increasing the first AC voltage and first AC frequency proportionally, the frequency increasing in steps of a first size until reaching a frequency where the second DC voltage decreases below the predetermined voltage;
detecting the decrease of the second DC voltage; and
decreasing the frequency of the AC motor voltage by a step size greater than the first step size to allow the second DC voltage to recover to the predetermined voltage.

9. The method of claim 8 wherein, until startup of the AC motor is detected, the AC motor voltage comprises a first phase and a starting phase AC, the first phase and starting phase differing in phase by between 58 and 68 degrees or between 112 and 122 degrees, and wherein the starting phase AC has a greater voltage magnitude than the first phase AC.

10. The method of claim 9 wherein the limit of the DC power source is determined by monitoring a voltage of the DC power source as the frequency of the AC motor voltage is increased, and determining when a slight increase of the frequency of the AC motor voltage triggers a percentage drop in the voltage of the DC power source that exceeds a percentage voltage drop limit.

11. The system of claim 1 wherein the AC motor is a split-phase motor and the AC power comprises a first phase AC power coupled to a main winding of the AC electric motor and a starting phase AC power coupled to a starting winding of the AC electric motor,
wherein the first phase AC power and the starting phase AC power are offset by a phase shift between 58 and 68 degrees or between 112 and 122 degrees; and
wherein the starting phase AC power is turned off after the motor is determined to have started and the AC power has reached a threshold frequency.

12. The system of claim 11 wherein the starting phase has voltage 2.23 times a main winding voltage when operating in the first mode.

13. The system of claim 7 wherein the nonzero phase shift is 63 degrees.

14. The system of claim 7 wherein the third phase AC power has magnitude 2.23 times higher than magnitude of the first phase AC power when operating in the first mode.

15. A system comprising:
an AC single phase, three-wire, induction electric motor having a main winding and a starting winding;
at least one photovoltaic panel acting as an only energy source of the system;
a DC-DC converter coupled to receive power from the at least one photovoltaic panel and provide a second DC voltage;
a variable-frequency motor drive (VFD) coupled to receive the second DC voltage and provide a first phase AC power to the main winding of the AC single phase three-wire induction electric motor and a second phase AC power to the starting winding of the AC single phase three-wire induction electric motor; and
a microcontroller configured to maintain to regulate the second DC voltage at a predetermined value;
the microcontroller being configured to operate in a first mode until the AC three-wire induction electric motor starts rotating, wherein during the first mode the microcontroller configures the VFD to gradually and simultaneously increases a voltage of both the first phase AC power and the second phase AC power and simultaneously increase a frequency of both the first and second phase AC power until the AC three-wire induction electric motor starts rotating, wherein the microcontroller is configured to detect that the AC single phase three-wire induction motor has started rotating by detecting decrease in current received from the at least one photovoltaic panel, and, when the AC single-phase three-wire induction motor has been detected as started rotating, to operate in a second mode;

wherein when operating in the second mode, the microcontroller disables the second phase AC power and uses a maximum-power-point tracking (MPPT) firmware to regulate the second DC voltage at the predetermined value while optimizing power output by increasing frequency and voltage of the first phase AC power up to a limit, the MPPT firmware increasing the frequency of the first AC power in steps of a first size while monitoring the second DC voltage, and where the MPPT firmware decreases frequency of the VFD in steps of a second size if the second DC voltage drops by more than a threshold from the predetermined value;

wherein during the first mode the AC power comprises a third phase AC power coupled to common node of the AC electric motor having a voltage magnitude equal to a voltage magnitude of the first phase AC power and a phase 180 degrees from a phase of the first phase AC power, and the second phase AC power has a voltage magnitude greater than the voltage magnitude of the first phase AC power.

16. The system of claim 15 wherein the second phase AC power is offset from the first phase AC power by 63 degrees and the voltage magnitude of the second phase AC power is 2.23 times the voltage magnitude of the first phase AC power.

* * * * *